US012785309B2

(12) United States Patent
Liao et al.

(10) Patent No.: US 12,785,309 B2
(45) Date of Patent: Nov. 3, 2026

(54) BOARD CONNECTOR AND BOARD-TO-BOARD CONNECTION ASSEMBLY

(71) Applicant: BELLWETHER ELECTRONIC CORP., Taoyuan City (TW)

(72) Inventors: Yen-Jang Liao, Taoyuan City (TW); Yung-Liang Chi, Taoyuan City (TW)

(73) Assignee: BELLWETHER ELECTRONIC CORP., Taoyuan City (TW)

( * ) Notice: Subject to any disclaimer, the term of this patent is extended or adjusted under 35 U.S.C. 154(b) by 334 days.

(21) Appl. No.: 18/424,945

(22) Filed: Jan. 29, 2024

(65) Prior Publication Data

US 2024/0266766 A1 Aug. 8, 2024

Related U.S. Application Data

(60) Provisional application No. 63/443,543, filed on Feb. 6, 2023.

(30) Foreign Application Priority Data

Dec. 6, 2023 (TW) ................................ 112147353

(51) Int. Cl.

| | |
|---|---|
| ***H01R 12/73*** | (2011.01) |
| ***H01R 12/70*** | (2011.01) |
| ***H01R 12/71*** | (2011.01) |
| ***H01R 13/04*** | (2006.01) |
| ***H01R 13/11*** | (2006.01) |
| ***H01R 13/115*** | (2006.01) |
| ***H01R 13/41*** | (2006.01) |
| ***H01R 13/627*** | (2006.01) |

(52) U.S. Cl.

CPC ......... *H01R 12/73* (2013.01); *H01R 12/7029* (2013.01); *H01R 12/7082* (2013.01); *H01R 12/716* (2013.01); *H01R 13/04* (2013.01); *H01R 13/113* (2013.01); *H01R 13/115* (2013.01); *H01R 13/41* (2013.01); *H01R 13/6272* (2013.01)

(58) Field of Classification Search

CPC ............................ H01R 12/73; H01R 12/7029
USPC .............................. 439/570, 357, 358, 733.1
See application file for complete search history.

(56) References Cited

U.S. PATENT DOCUMENTS 4,900,278 A * 2/1990 Yamada ............... H01R 13/193 439/924.1
5,114,355 A * 5/1992 Kimmel ............... H01R 12/724 439/79

(Continued)

FOREIGN PATENT DOCUMENTS

| | | |
|---|---|---|
| CN | 103326171 A | 9/2013 |
| TW | 202224281 A | 6/2022 |

*Primary Examiner* — Phuong K Dinh
(74) *Attorney, Agent, or Firm* — Li & Cai Intellectual Property (USA) Office

(57) ABSTRACT

A board connector and a board-to-board connection assembly are provided. The board connector includes an insulating body and a plurality of female terminals. The insulating body includes a plurality of female-terminal slots. At least one of the female terminals includes at least two sheet structures. The at least two sheet structures of the at least one of the female terminals are disposed in one of the female-terminal slots. A section of each of the at least two sheet structures located in the female-terminal slot has an elastic arm.

19 Claims, 14 Drawing Sheets

(56) References Cited

U.S. PATENT DOCUMENTS

| | | | | | |
|---|---|---|---|---|---|
| 5,342,221 | A * | 8/1994 | Peterson | H01R 13/514 | 439/877 |
| 5,836,773 | A * | 11/1998 | McHugh | H01R 12/716 | 439/74 |
| 6,471,544 | B1 * | 10/2002 | Huang | H01R 12/7029 | 439/567 |
| 7,878,870 | B2 * | 2/2011 | Fan | H01R 12/57 | 439/876 |
| 8,033,861 | B2 * | 10/2011 | Zhu | H01R 12/7029 | 439/567 |
| 8,961,199 | B2 * | 2/2015 | Tai | H01R 12/724 | 439/79 |
| 9,312,650 | B1 * | 4/2016 | Chen | H01R 12/724 | |

* cited by examiner

BOARD CONNECTOR AND BOARD-TO-BOARD CONNECTION ASSEMBLY

CROSS-REFERENCE TO RELATED PATENT APPLICATION

This application claims the benefit of priorities to Taiwan patent application Ser. No. 112147353, filed on Dec. 6, 2023, and the U.S. Provisional Patent Application Ser. No. 63/443,543, filed on Feb. 6, 2023. The entire content of each of the above identified applications is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a connector and a connection assembly, and more particularly to a board connector and a board-to-board connection assembly.

BACKGROUND OF THE DISCLOSURE

A conventional wire-to-board connector achieves connection through mutual docking of a board-side (male) connector and a wire-side (female) connector. In different application scenarios (such as a board-to-board connector), it is necessary to redesign terminals of the wire-side (female) connector for conversion into a board-side (female) connector. Especially in smaller-sized application scenarios, the terminals of the female connector that is adjusted to be connected to a board side cannot withstand large currents, thereby causing limitations in application.

SUMMARY OF THE DISCLOSURE

In response to the above-referenced technical inadequacy, the present disclosure provides a board connector and a board-to-board connection assembly, which are mainly used to improve on the problem that terminals of a conventional female connector (acting as the board connector) cannot withstand large currents.

In order to solve the above-mentioned problem, one of the technical aspects adopted by the present disclosure is to provide a board connector. The board connector includes an insulating body and a plurality of female terminals. The insulating body includes a plurality of female-terminal slots. At least one of the female terminals includes at least two sheet structures, the two sheet structures of the at least one of the female terminals are disposed in one of the female-terminal slots, and each of the at least two sheet structures has at least one elastic arm located in the female-terminal slot.

In order to solve the above-mentioned problem, another one of the technical aspects adopted by the present disclosure is to provide a board connector. The board connector includes an insulating body, a plurality of tubular structures, and a plurality of female terminals. The tubular structures extend from an end surface of the insulating body. Each of the tubular structures includes one or more female-terminal slots. At least one of the female terminals includes at least two terminal components. Each of the female terminals is disposed in one of the female-terminal slots.

In order to solve the above-mentioned problem, yet another one of the technical aspects adopted by the present disclosure is to provide a board-to-board connection assembly. The board-to-board connection assembly includes a male connector and a female connector. The male connector is fixed on a first circuit board, and the male connector includes a first insulating body and a plurality of male terminals. The first insulating body includes a plurality of first terminal-male slots. One of two ends of each of the male terminals is located in one of the first terminal-male slots, and another one of the two ends of each of the male terminals is electrically coupled to the first circuit board. The female connector is fixed on a second circuit board, and the female connector includes a second insulating body and a plurality of female terminals. The second insulating body includes a plurality of tubular structures. When the male connector is docked with the female connector, the tubular structures are inserted into the first terminal-male slots. One of two ends of each of the female terminals is located in one of the tubular structures, and another one of the two ends of each of the female terminals is electrically coupled to the second circuit board.

Therefore, in the board connector and the board-to-board connection assembly provided by the present disclosure, by configuring a single female terminal to include two sheet structures, the female terminals of the female connector can carry a larger current as compared to the terminals of the conventional female connector.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
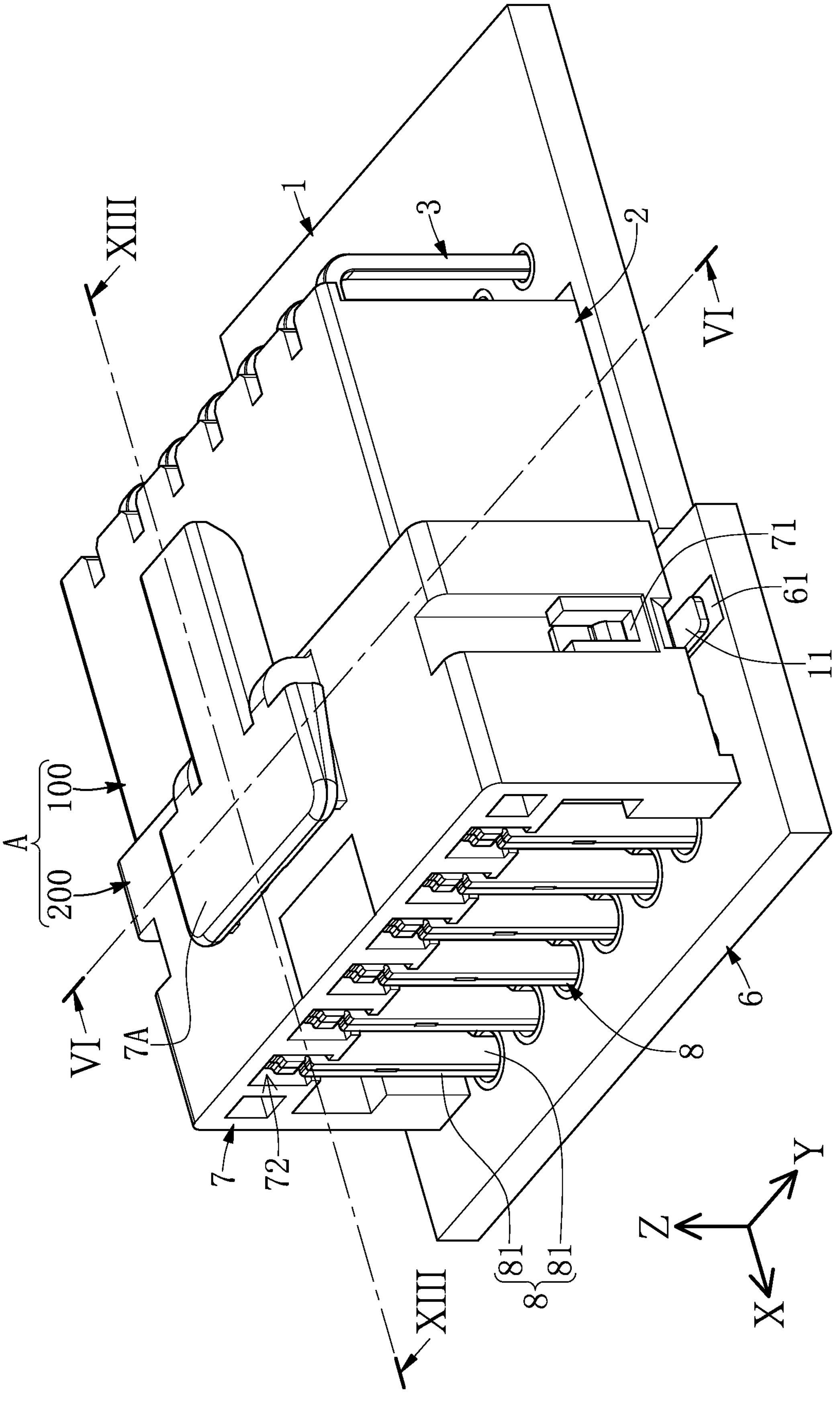
FIG. 1 is a schematic assembled view of a board-to-board connection assembly according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
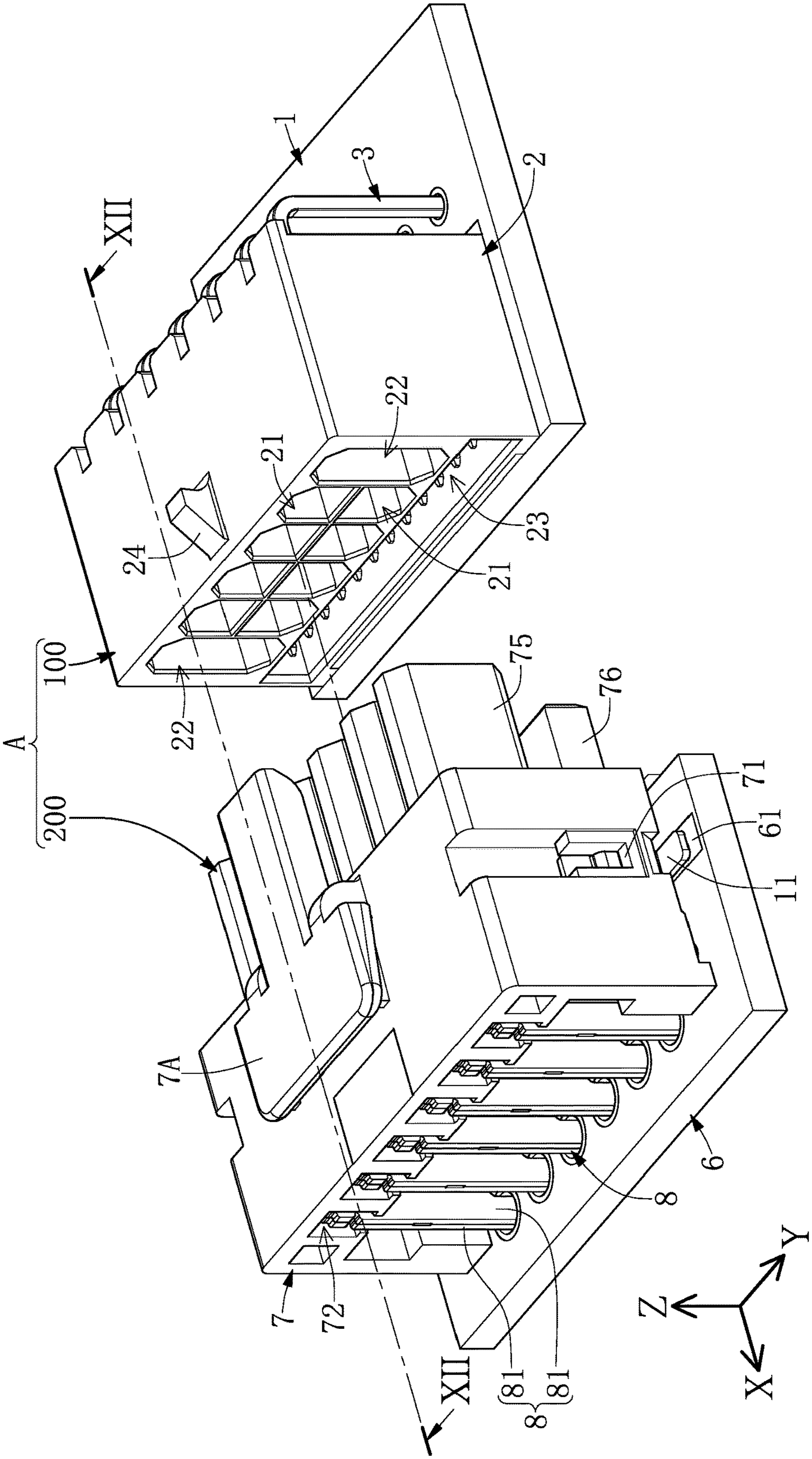
FIG. 2 is a schematic view showing a female connector and a male connector of the board-to-board connection assembly being separated from each other according to the present disclosure.
Figure 3:
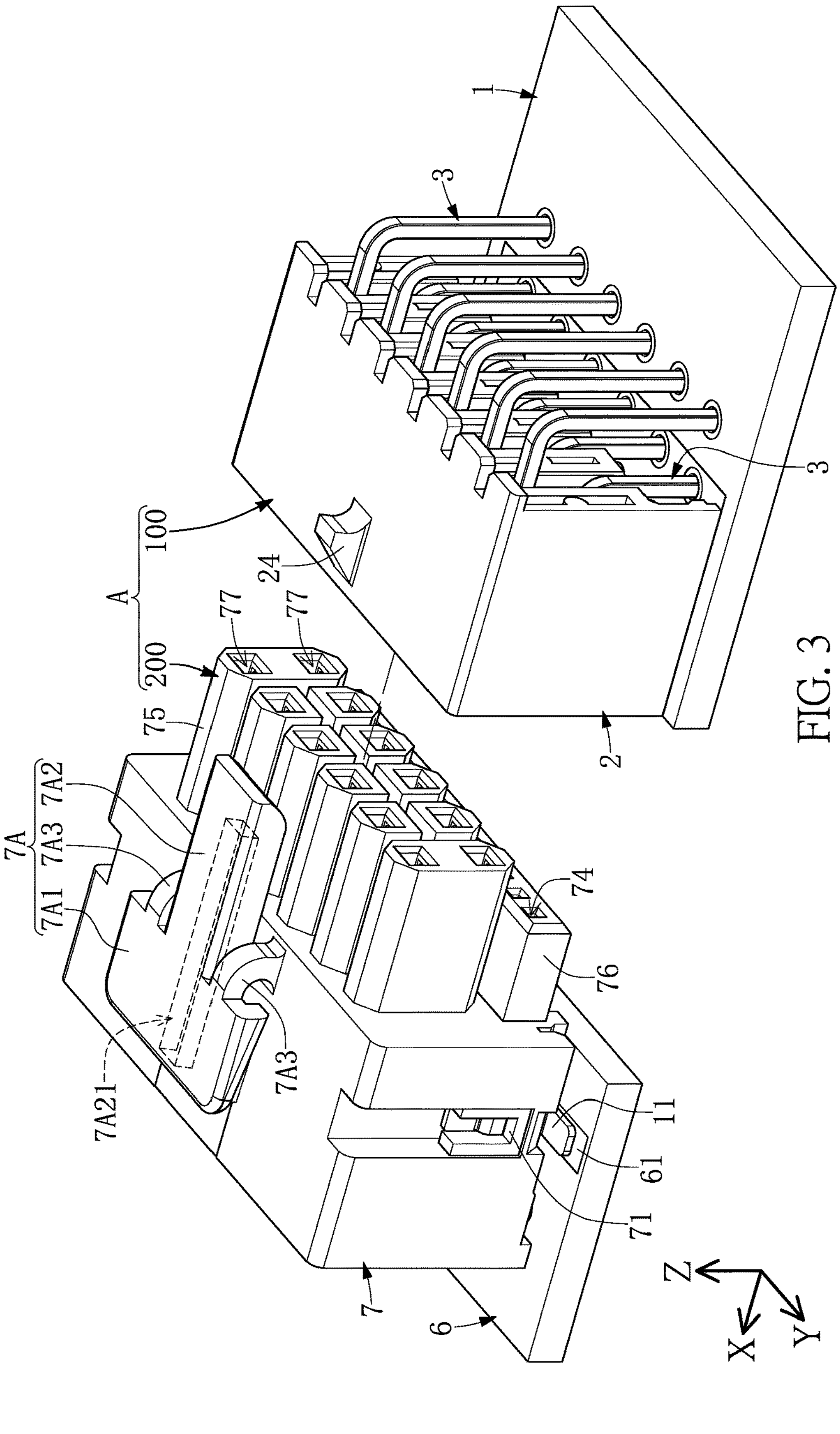
FIG. 3 is another schematic view showing the female connector and the male connector of the board-to-board connection assembly being separated from each other according to the present disclosure.
Figure 4:
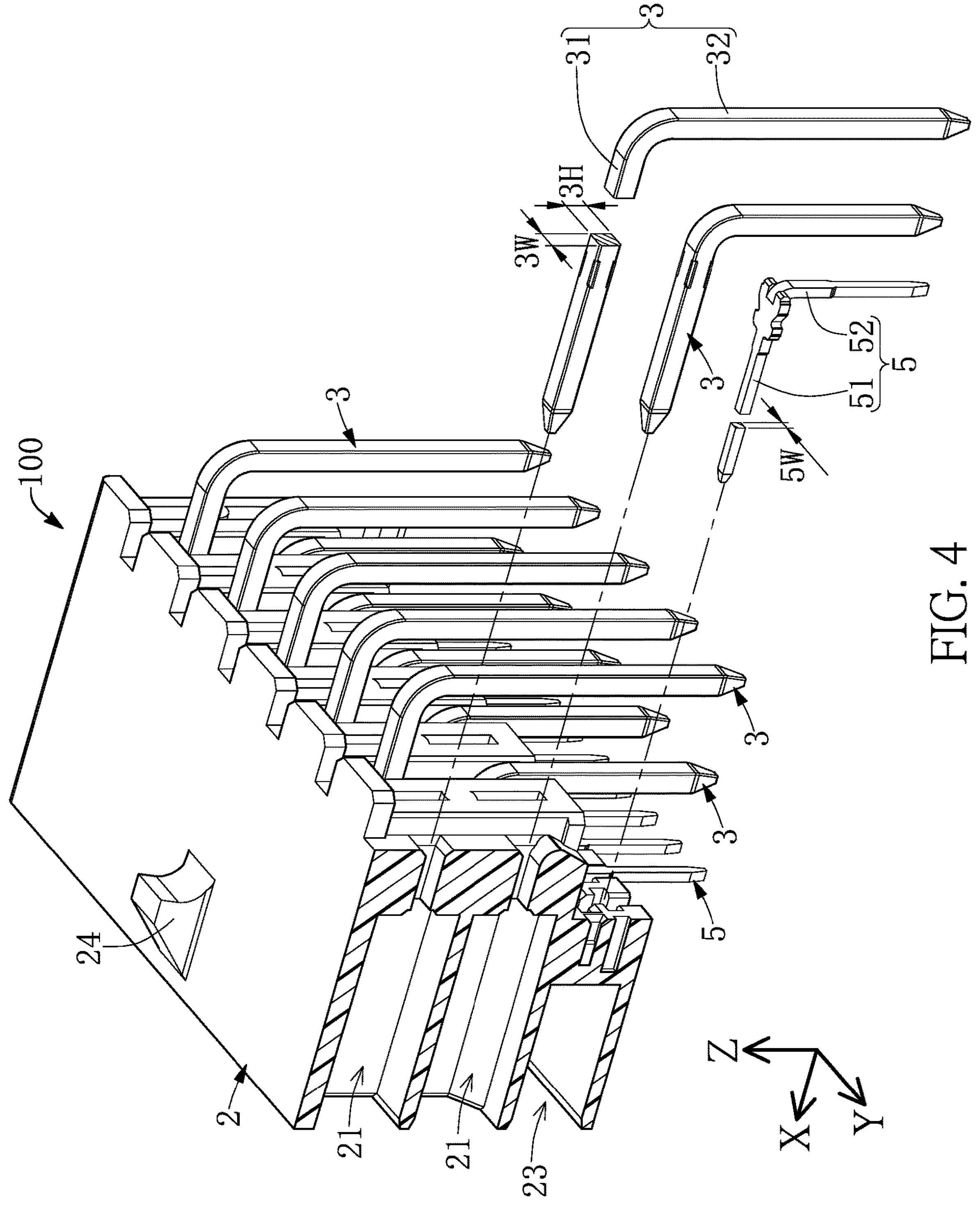
FIG. 4 is a schematic partial cross-sectional view of the male connector of the board-to-board connection assembly that is partly exploded according to the present disclosure.

Referring to FIG. 1 to FIG. 4, FIG. 1 is a schematic assembled view of a board-to-board connection assembly according to the present disclosure, FIG. 2 and FIG. 3 are each a schematic view showing a female connector and a male connector of the board-to-board connection assembly being separated from each other according to the present disclosure, and FIG. 4 is a schematic partial cross-sectional view of the male connector of the board-to-board connection assembly that is partial exploded according to the present disclosure.

A board-to-board connection assembly A of the present disclosure includes a male connector 100 and a female connector 200, and the male connector 100 is configured to be mated with the female connector 200. The male connector 100 includes a first insulating body 2, a plurality of male terminals 3, and one or more first signal terminals 5.

The first insulating body 2 is disposed to be fixed on a first circuit board 1, and a part of each of the male terminals 3 and a part of each of the first signal terminals 5 are configured to be fixed in the first insulating body 2. One end of each of the male terminals 3 and one end of each of the first signal terminals 5 are electrically coupled to the first circuit board 1.

Figure 8:
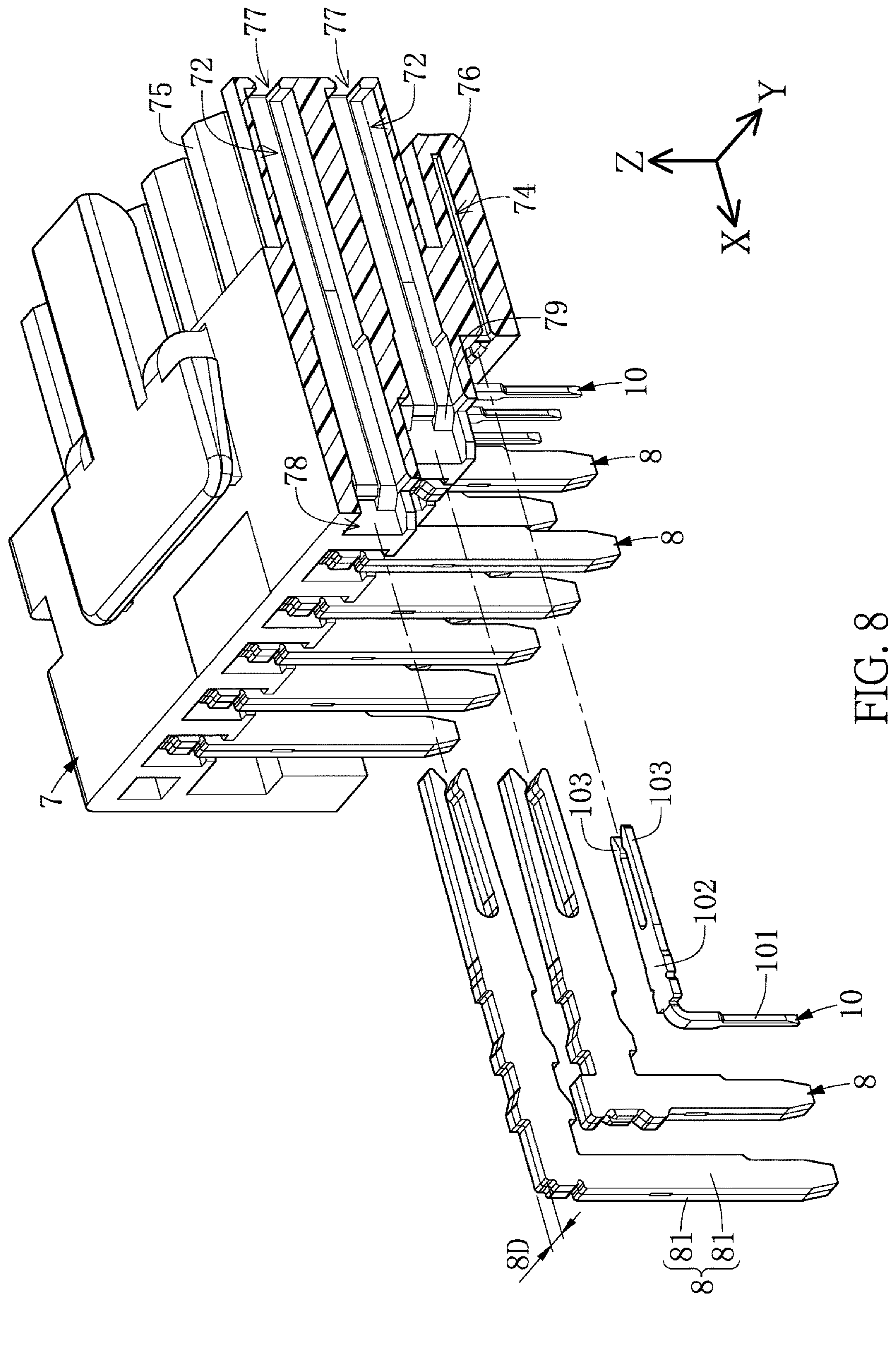
FIG. 8 is a schematic partial cross-sectional view of the female connector that is partly exploded according to the present disclosure.

The female connector 200 includes a second insulating body 7, a plurality of female terminals 8, and one or more second signal terminals 10 (as shown in FIG. 8). The second insulating body 7 is fixed on a second circuit board 6, and a part of each of the female terminals 8 and a part of each of the second signal terminals 10 are correspondingly fixed in the second insulating body 7. One end of each of the female terminals 8 and one end of each of the second signal terminals 10 are electrically coupled to the second circuit board 6.

In practical applications, the first insulating body 2 may include a plurality of first terminal-male slots 21 and a first signal slot 23. The first terminal-male slots 21 are arranged side by side to form one or more than one terminal slot row. One of the male terminals 3 is disposed in one of the first terminal-male slots 21. Another end of each of the male terminals 3 is located in one of the first terminal-male slots 21, and each of the first terminal-male slots 21 has one single male terminal 3 there-in.

The first insulating body 2 may also include one or more second terminal-male slots 22. The size of an end surface of each of the second terminal-male slots 22 is larger than the size of an end surface of each of the first terminal-male slots 21, and more than one male terminal 3 is disposed in each of the second terminal-male slots 22. The first terminal-male slots 21 and at least one of the second terminal-male slots 22 are arranged side by side to form a power rectangular docking interface.

In the present embodiment, the first terminal-male slots 21 are arranged in two rows, and at least one of the second terminal-male slots 22 is arranged with the first terminal-male slots 21 in a mixed manner, so as to form a rectangular docking interface. While one of two ends of each of the male terminals 3 is located in one of the first terminal-male slots 21 or one of the second terminal-male slots 22, another one of the two ends of each of the male terminals 3 extends from a rear end of the first insulating body 2, and is bent downward to be electrically coupled to the first circuit board 1. The male terminals 3 that are located in different rows are only different from one another in size.

Each of the male terminals 3 has a transverse section 31 and a longitudinal section 32 that are respectively fixed to a corresponding one of the first terminal-male slots 21 (or the second terminal-male slots 22) and the first circuit board 1. Each of the male terminals 3 can be a pillar structure that is integrally formed, and the pillar structure is formed to have the transverse section 31 and the longitudinal section 32 by bending. Each of the male terminals 3 can be substantially L-shaped.

The first signal slot 23 is located on one side of the power rectangular docking interface formed by the first terminal-male slots 21 and at least one of the second terminal-male slots 22. In the present embodiment, the first signal slot 23 is arranged side by side with the power rectangular docking interface and a gap is there between. Each of the first signal terminals 5 has a transverse section 51 and a longitudinal section 52 that are respectively fixed to the first signal slot 23 and the first circuit board 1. That is to say, one end of each of the first signal terminals 5 is located in the first signal slot 23, so as to form a rectangular signal docking interface.

In practical applications, each of the male terminals 3 can be used to transmit power, and each of the first signal terminals 5 can be used to transmit signals. Each of the first signal terminals 5 may be a single pillar structure that is integrally formed, and the pillar structure is formed to have the transverse section 51 and the longitudinal section 52 by bending. Each of the first signal terminals 5 can be substantially L-shaped.

In different embodiments, the male connector 100 may also only include the power rectangular docking interface, and does not include signal docking interface, i.e., the first signal slot 23 and the first signal terminals 5.

Figure 5:
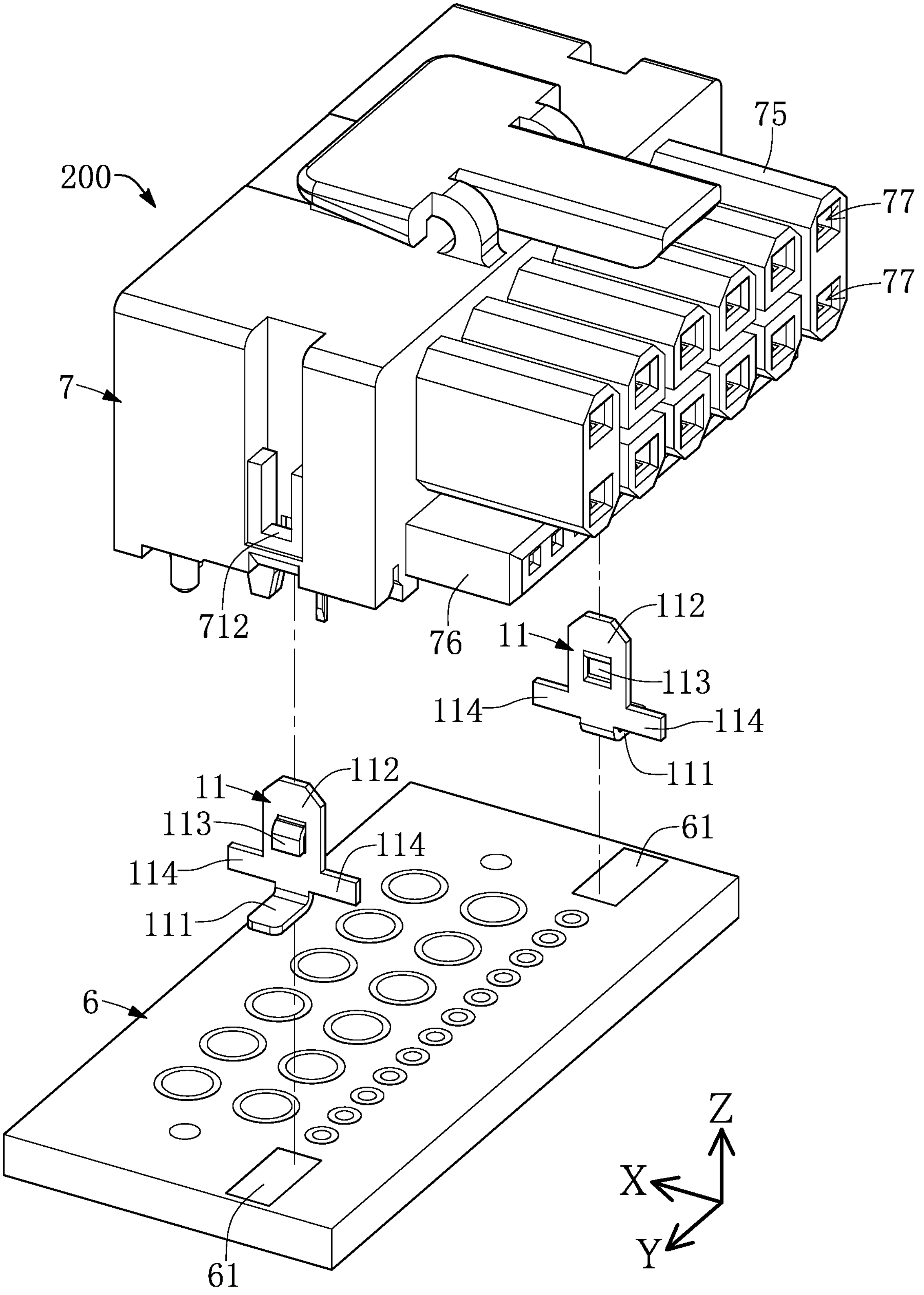
FIG. 5 is a schematic partly exploded view of the female connector of the board-to-board connection assembly according to the present disclosure.
Figure 6:
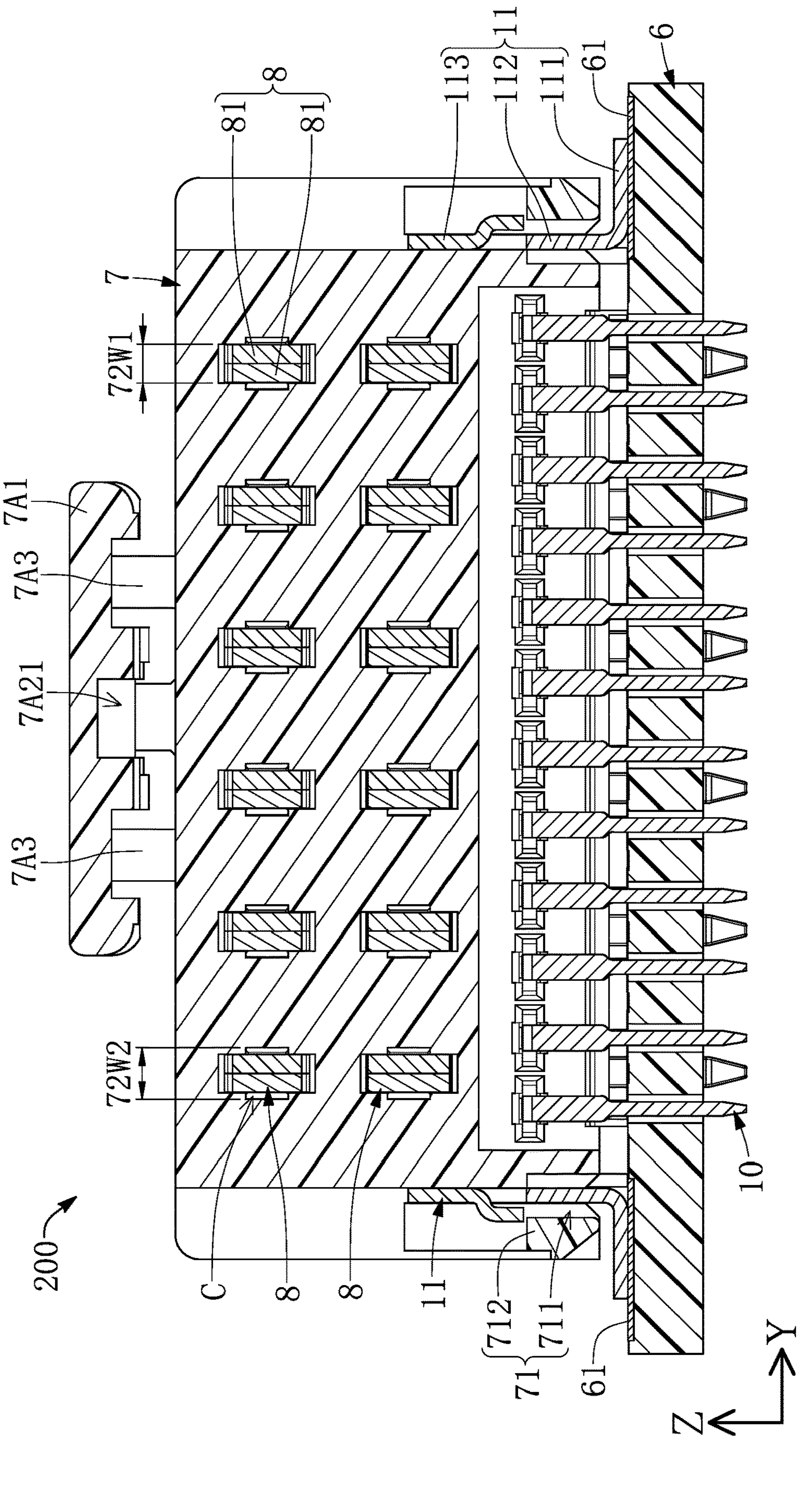
FIG. 6 is a schematic cross-sectional view of the female connector taken along line VI-VI of FIG. 1.

Referring to FIG. 5 and FIG. 6, FIG. 5 is a schematic partial exploded view of the female connector of the board-to-board connection assembly according to the present disclosure, and FIG. 6 is a schematic cross-sectional view of the female connector taken along line VI-VI of FIG. 1.

The female connector 200 may also include two auxiliary fixing components 11, and the second insulating body 7 may correspondingly include two auxiliary fixing structures 71. A part of each of the two auxiliary fixing components 11 is used to be fixed to one of the two auxiliary fixing structures 71, and another part of each of the two auxiliary fixing components 11 is used to be fixed to the second circuit board 6.

Specifically, each of the two auxiliary fixing structures 71 can be exemplified to include a through hole 711 and a resisting portion 712, and each of the two auxiliary fixing components 11 may include a first fixing portion 111, a second fixing portion 112, and an elastic engaging portion 113. The first fixing portion 111 and the second fixing portion 112 may be sheet structures that are connected to each other, so as to form an L-shaped sheet structure. The first fixing portion 111 is used to be fixed on the second circuit board 6 (e.g., by welding or gluing), and the second fixing portion 112 is used to penetrate the through hole 711 of each of the two auxiliary fixing structures 71.

When the second fixing portion 112 is inserted into the through hole 711, the elastic engaging portion 113 is subject to elastic deformation. When the elastic engaging portion 113 passes through the through hole 711, the elastic engaging portion 113 can be restored to an uncompressed state due to an elastic restoring force. In this way, the elastic engaging portion 113 can cooperate with the resisting portion 712 to limit the movement of the two auxiliary fixing components 11 relative to the two auxiliary fixing structures 71.

In practical applications, each of the two auxiliary fixing components 11 may also include two limiting portions 114, the two limiting portions 114 are disposed on two sides of one end of the second fixing portion 112, and the two limiting portions 114 and the second fixing portion 112 can substantially have an inverted T-shaped structure. When the second fixing portion 112 of each of the two auxiliary fixing components 11 is inserted into the through hole 711, the two limiting portions 114 correspondingly abut against a portion of the second insulating body 7 (e.g., a lower edge of the second insulating body 7). In this way, the two limiting portions 114 can limit a movement range of the two auxiliary fixing components 11 relative to the second insulating body 7. During a process of fixing the two auxiliary fixing components 11 to the two auxiliary fixing structures 71, when the two auxiliary fixing components 11 can no longer move relative to the second insulating body 7 due to the two limiting portions 114, the two auxiliary fixing components 11 can be determined to be mutually fixed with the second insulating body 7.

In one specific application, each of the two auxiliary fixing components 11 can be a metallic structure, the second circuit board 6 may include two auxiliary welding portions 61, and the first fixing portions 111 of the two auxiliary fixing components 11 can be respectively fixed on the two auxiliary welding portions 61 by welding.

As mentioned above, through the configuration of the two auxiliary fixing components 11 and the two auxiliary fixing structures 71, the second insulating body 7 can be more firmly fixed on the second circuit board 6. Naturally, the external appearance, the size, and the position of placement of each of the two auxiliary fixing components 11 are not limited to those shown in the drawings, and can be adjusted according to practical requirements. It should be noted that in different embodiments, the female connector 200 may also not include the two auxiliary fixing components 11 and the two auxiliary fixing structures 71.

Figure 9:
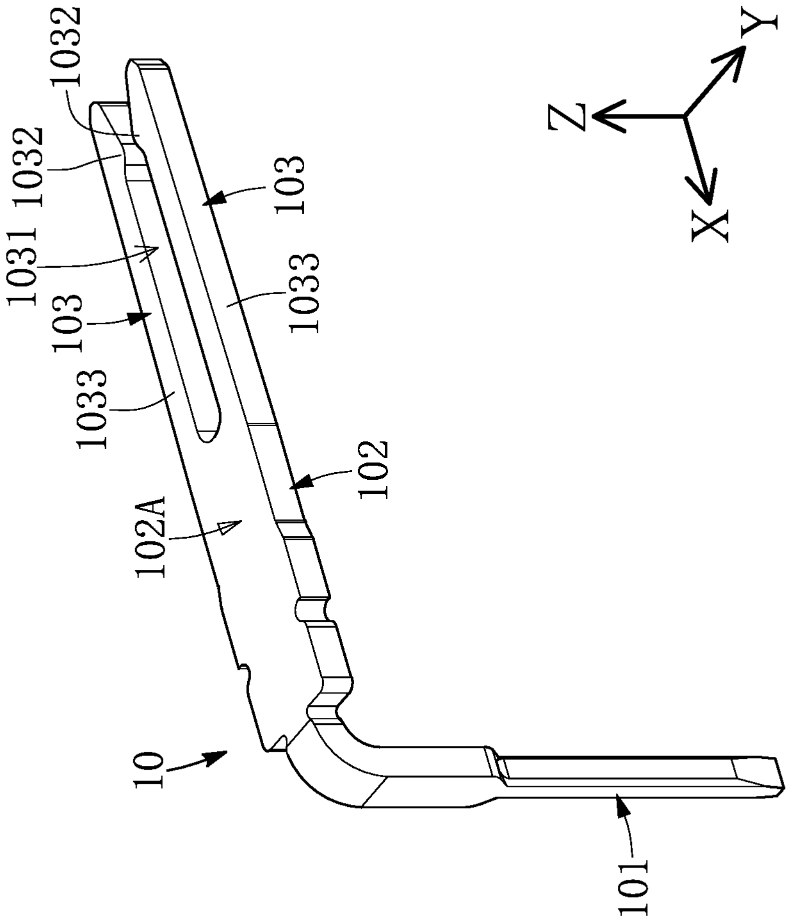
FIG. 9 is a schematic view of a female terminal of the female connector according to the present disclosure.
Figure 10:
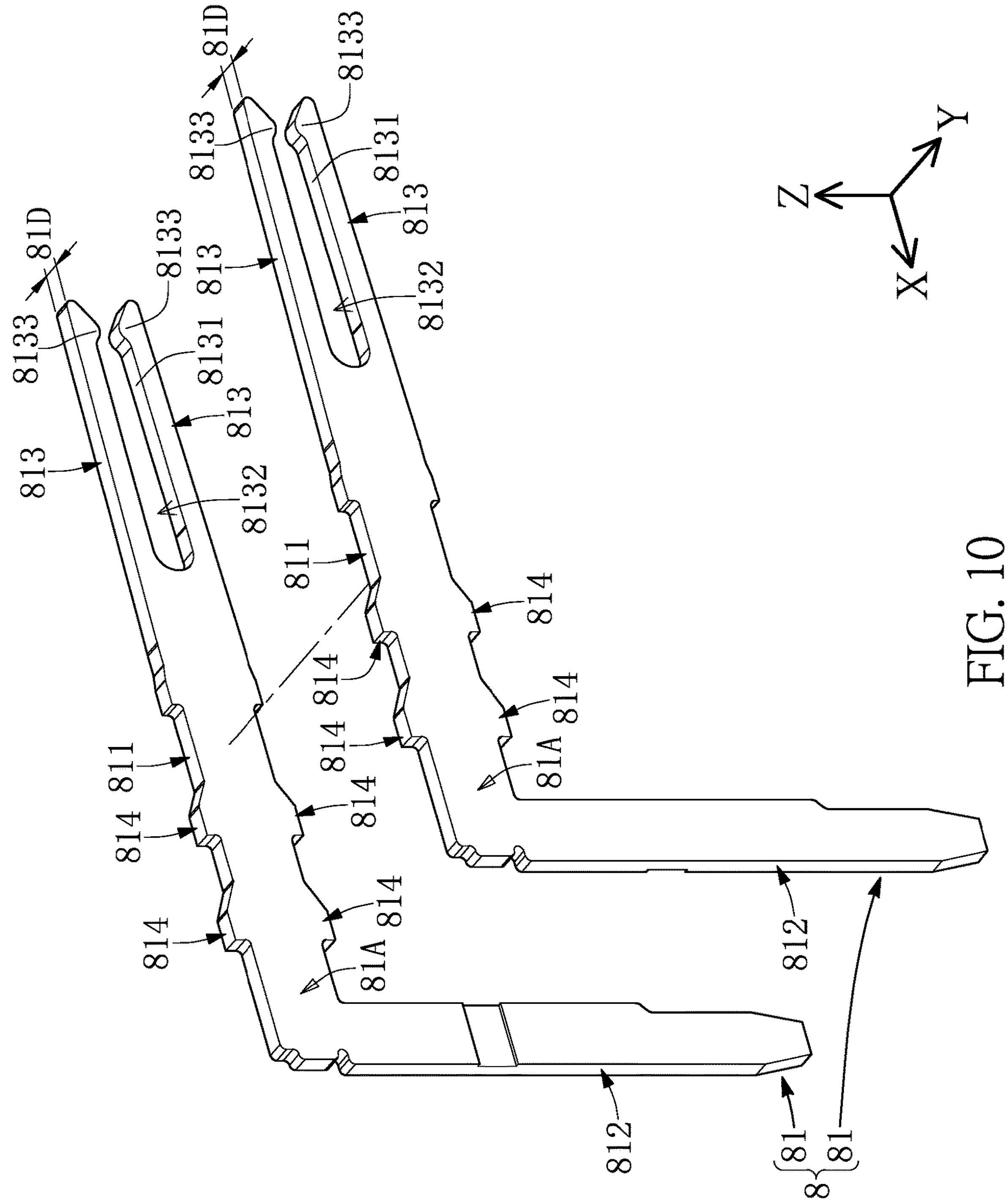
FIG. 10 is a schematic view of signal terminals of the female connector according to the present disclosure.

Referring to FIG. 5, and FIG. 7 to FIG. 10, FIG. 7 is a schematic view of an insulating body of the female connector according to the present disclosure, FIG. 8 is a schematic partial cross-sectional view of the female connector that is partial exploded according to the present disclosure, FIG. 9 is a schematic view of a female terminal of the female connector according to the present disclosure, and FIG. 10 is a schematic view of signal terminals of the female connector according to the present disclosure.

The second insulating body 7 may include a plurality of rectangle structures 75, and the rectangle structures 75 extend from an end surface of the second insulating body 7. When the male connector 100 and the female connector 200 are docked, the rectangle structures 75 are each inserted into the first terminal-male slots 21 or the second terminal-male slots 22. Each of the rectangle structures 75 has one or more female-terminal slots 72. In the present embodiment, the rectangle structures 75 has at least one female-terminal slot 72. The second insulating body 7 may also include a plate structure 76 that extends from one side of the end surface of the second insulating body 7.

When the male connector 100 and the female connector 200 are docked, the plate structure 76 is inserted into the first signal slot 23. The plate structure 76 has a plurality of second signal slots 74, and the second signal slots 74 may be arranged side by side. Another end of each of the second signal terminals 10 is arranged in one of the second signal slots 74.

The rectangle structures 75 are arranged side by side to form a rectangular array, and the female-terminal slots 72 of the tubular structures 75 are arranged side by side. The plate structure 76 can be located on one side of the rectangular array, and is a cuboid structure connected to one side of the second insulating body 7. In an example where the female-terminal slots 72 are arranged in two rows side by side, a length of each of the female-terminal slots 72 in an upper row can be greater than a length of each of the female-terminal slots 72 in a lower row. A part of the female terminals 8 is positioned in corresponding female-terminal slots 72.

At least one of the female terminals 8 in the present disclosure includes a plurality of terminal components, so as to ensure that a contact dimension between the female terminals 8 and the male terminals 3 can meet the requirements. In different embodiments, the female connector 200 may only include the plurality of rectangle structures 75 and the plurality of female terminals 8 without including the plate structure 76 and the second signal terminals 10.

Figure 7:
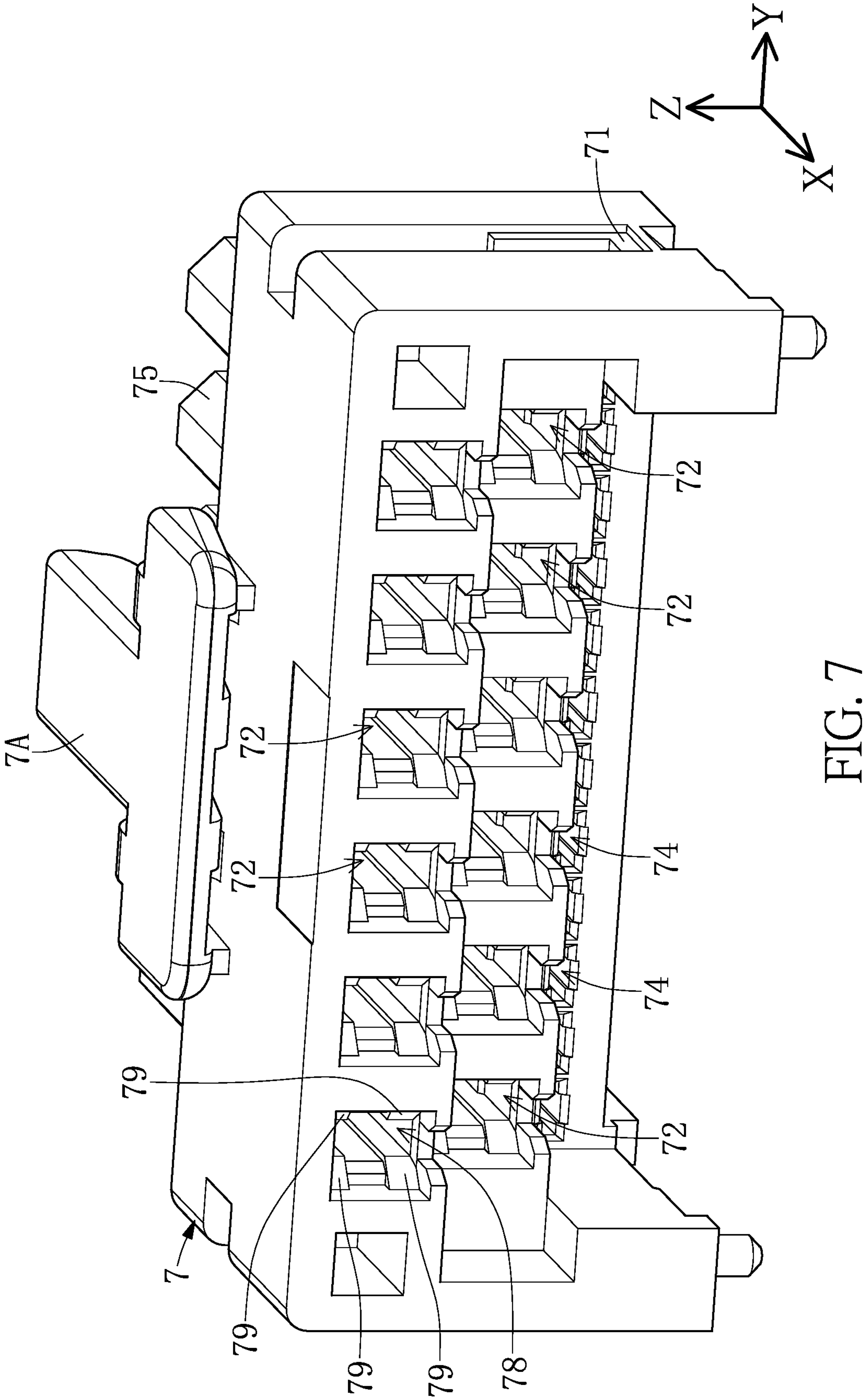
FIG. 7 is a schematic view of an insulating body of the female connector according to the present disclosure.

Referring to FIG. 5, FIG. 7, and FIG. 8, a free end of each of the rectangle structures 75 has an insertion opening 77. Another side of the second insulating body 7 has a plurality of installation openings 78, and the second insulating body 7 may have at least two guide slopes 79 adjacent to each of the installation openings 78. The at least two guide slopes 79 are arranged facing each other, and a linear distance between the at least two guide slopes 79 decreases from back to front. Accordingly, when the female terminals 8 are installed in the female-terminal slots 72 through the installation openings 78, the at least two guide slopes 79 can guide the female terminals 8 to correctly enter the female-terminal slots 72. Each of the second signal slots 74 is formed with openings at two ends of the plate structure 76.

Referring to FIG. 6 and FIG. 8, a minimum width 72W1 of a partial section of each of the female-terminal slots 72 may be less than or equal to a thickness 8D of each of the female terminals 8. Referring to FIG. 10, in the present embodiment, the terminal components of the female terminals 8 are sheet structures 81 that include a contact segment, a fixing segment, and a pin segment. The fixing segment is connected between the contact segment and the pin segment. The female terminals 8 is fixed in the female-terminal slots 72 by interference fit. That is to say, a total thickness 8D of the two sheet structures 81 of the female terminals 8 is greater than or equal to the minimum width 72W1. The contact segment is located in one of the female-terminal slots 72 of the tubular structures 75, and the pin segment is electrically connected to the second circuit board 6. In one of the embodiments, at least one of the female terminals 8 has at least two sheet structures 81, the appearance and the size of these sheet structures 81 of the female terminal 8 are substantially the same, and some of the female terminals 8 may have only one single sheet structure.

In one of the embodiments, a maximum width 72W2 of a portion of each of the female-terminal slots 72 may be greater than the thickness 8D of one of the female terminals 8 disposed in the female-terminal slot 72, and heat dissipation channels C are formed between the female terminals 8 and the corresponding female-terminal slots 72. The heat dissipation channels C, the insertion opening 77, and the installation opening 78 in the same female-terminals lot 72 may be in spatial communication with each other. Through the configuration of the heat dissipation channels C, heat generated by the female terminals 8 during transmission of large currents can be effectively dissipated. The quantity of the heat dissipation channel C formed by one single female-terminal slot 72 and the female terminal 8 is not limited to two as shown in the drawing.

Referring to FIG. 9, each of the second signal terminals 10 can be exemplified to have a longitudinal section 101 and a transverse section 102. The longitudinal section 101 can be similar to a pillar structure, and the transverse section 102 has two elastic arms 103 extending from one end of the transverse section 102. The two elastic arms 103 are spaced apart from each other and face each other, and a gap 1031 is defined between the two elastic arms 103. The gap 1031 is used to accommodate the first signal terminals 5 of the male connector 100 (as shown in FIG. 4). Each of the two elastic arms 103 may also have a convex portion 1032 that is located at a position near a free end of each of the two elastic arms 103. Each of the convex portions 1032 is formed on an inner surface of the elastic arm 103, and a distance between the two convex portions 1032 of the two elastic arms 103 is less than a width 5W of each of the first signal terminals 5 (as shown in FIG. 4). During a mutual insertion of the male connector 100 and the female connector 200, when the first signal terminal 5 is inserted between the two convex portions 1032, the two elastic arms 103 undergo elastic deformation. The two elastic arms 103 can securely grip the first signal terminal 5 with an elastic restoring force generated by the two elastic arms 103.

Referring to FIG. 8 and FIG. 10, a single one of the female terminals 8 can include two sheet structures 81 that have exactly the same appearance and size. In different embodiments, a single one of the female terminals 8 may 8 may include three or more sheet structures 81.

Each of the sheet structures 81 can be exemplified to have a transverse section 811, a longitudinal section 812, and two elastic arms 813. The two elastic arms 813 extend from one end of the transverse section 811. Another end of the transverse section 811 is connected to the longitudinal section 812. The transverse section 811 and the longitudinal section 812 can form a structure that is substantially L-shaped.

In different embodiments, each of the sheet structures 81 may include only one single elastic arm 813. In one embodiment, the longitudinal sections 812 of the sheet structures 81 included in one of the female terminals 8 can be attached to each other, and are inserted into the same through holes of the second circuit board 6. In the same female-terminal 8, a length of the elastic arm 813 of one of the two sheet structures 81 can be unequal to a length of the elastic arm 813 of another one of the two sheet structures 81. Thereby, contact areas of the elastic arms 813 of the two sheet structures 81 (i.e., the areas in contact with the male terminal 3) can be staggered in an anterior-posterior direction.

As shown in FIG. 9 and FIG. 10, it is worth mentioning that a wide side 81A of each of the sheet structures 81 included in the female terminal 8 can be exemplified to be located on the X-Z plane of a coordinate system shown in the drawing, and a wide side 102A of the transverse section 102 of each of the second signal terminals 10 is located on the X-Y plane of the coordinate system shown in the drawing. That is to say, the wide side 81A of the sheet structure 81 and the wide side 102A of the transverse section 102 of the second signal terminal 10 may be perpendicular to each other.

Figure 11:
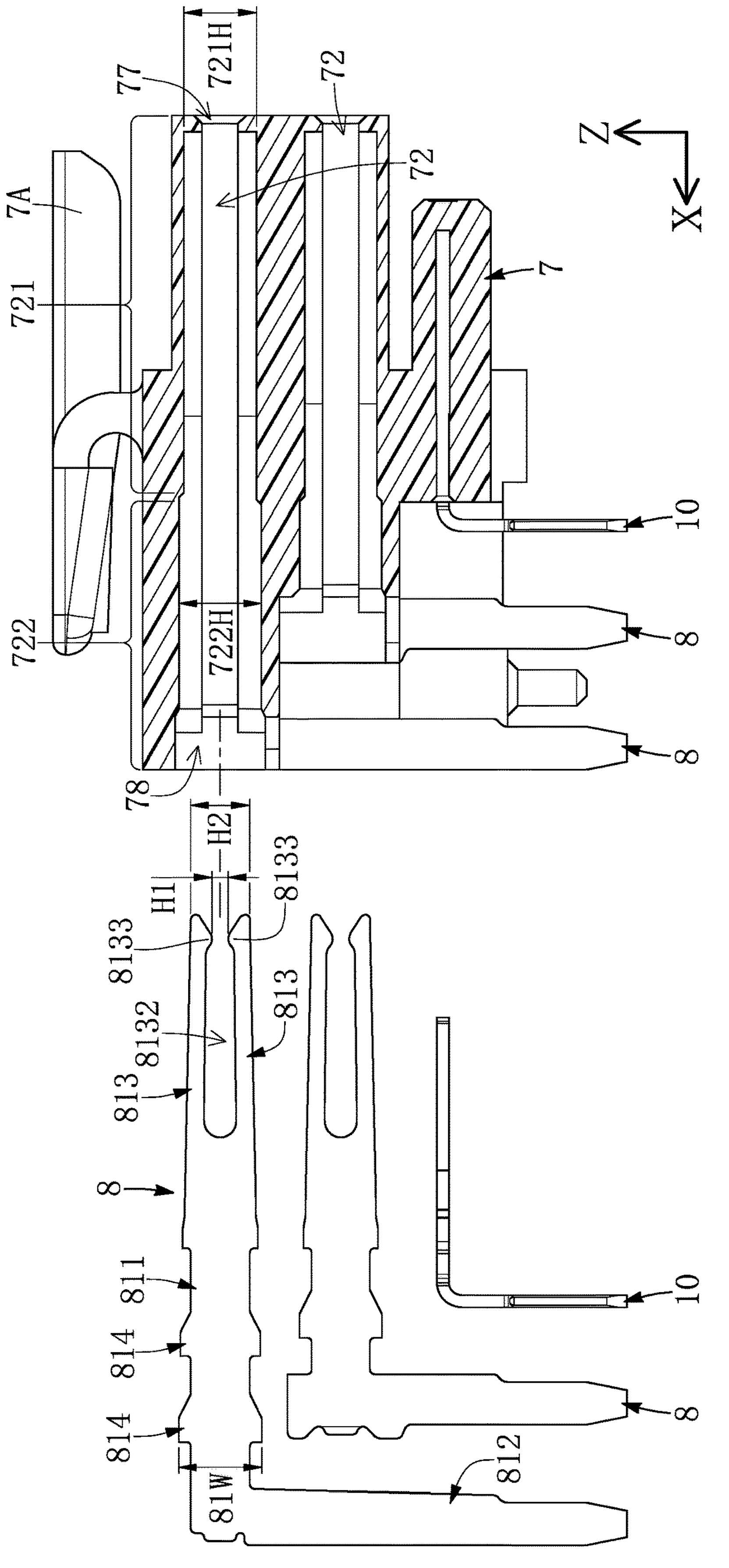
FIG. 11 is a schematic side view of FIG. 8.
Figure 12:
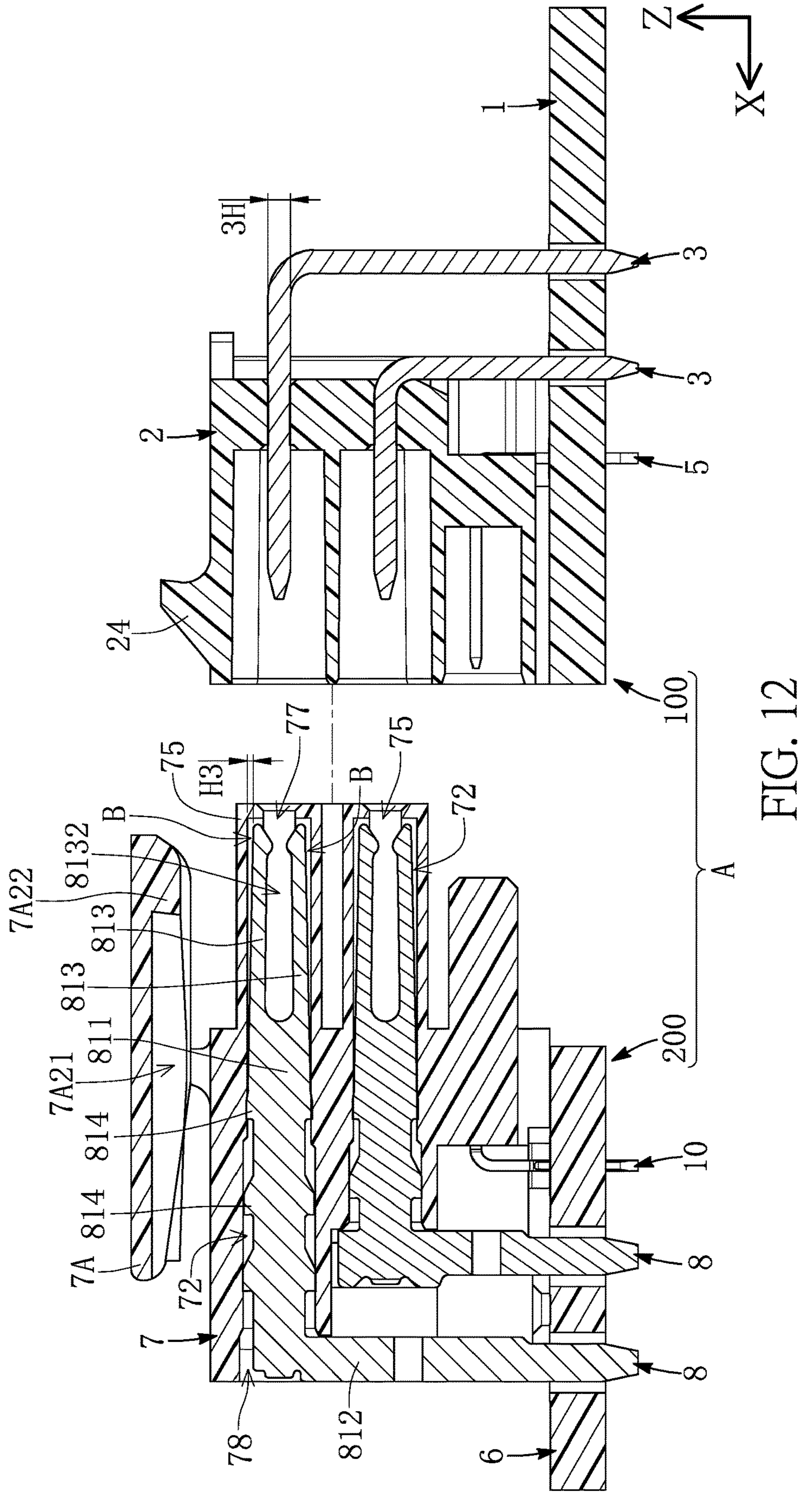
FIG. 12 is a schematic cross-sectional view of the board-to-board connection assembly taken along line XII-XII of FIG. 2.
Figure 13:
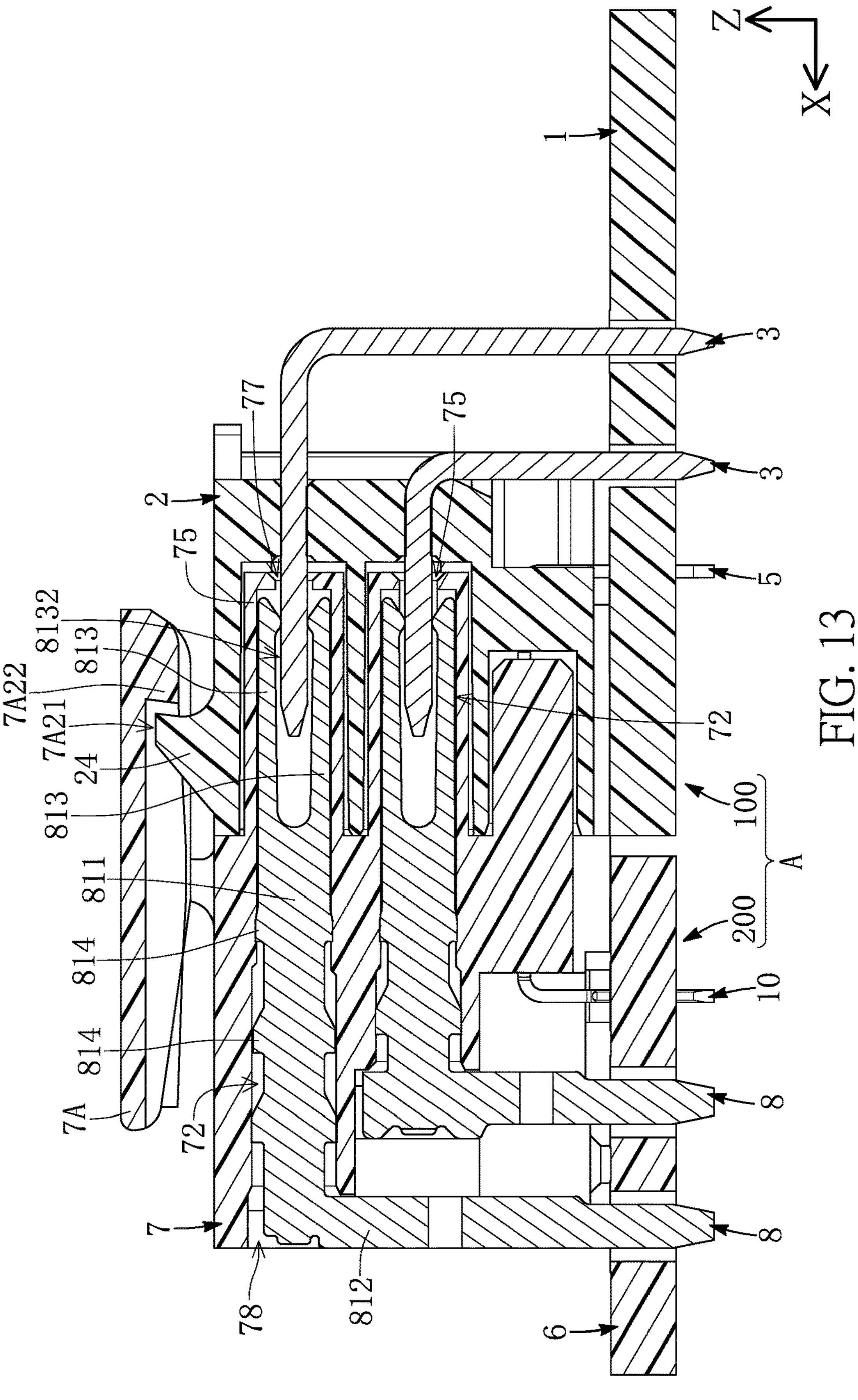
FIG. 13 is a schematic cross-sectional view of the board-to-board connection assembly taken along line XIII-XIII of FIG. 1.

Referring to FIG. 8, and FIG. 10 to FIG. 13, FIG. 11 is a schematic side view of FIG. 8, FIG. 12 is a schematic cross-sectional view of the board-to-board connection assembly taken along line XII-XII of FIG. 2, and FIG. 13 is a schematic cross-sectional view of the board-to-board connection assembly taken along line XIII-XIII of FIG. 1.

The two elastic arms 813 of the sheet structure 81 have narrow sides 8131 that are spaced apart from each other, and an insertion gap 8132 is defined between inner surfaces of the two elastic arms 813 that are configured to face each other and be spaced apart from each other. The insertion gap 8132 is used to accommodate one of the male terminals 3.

In practical applications, each of the two elastic arms 813 may also have at least one contact protrusion 8133 that is located on an inner side of the elastic arm 813 (near its free end), and the at least one contact protrusion 8133 is used to contact the male terminal 3. A distance H1 between the two contact protrusions 8133 of each of the sheet structures 81 (as shown in FIG. 11) is less than a height 3H of the male terminal 3 (as shown in FIG. 12). When the male terminal 3 is inserted into the insertion gap 8132, the male terminals 3 pushes against the two contact protrusions 8133, so that the two elastic arms 813 are elastically deformed in a direction away from the male terminal 3.

Each of the sheet structures 81 also has a plurality of engaging portions 814. Each of the female-terminal slots 72 may include an elastic arm section 721 and an engaging portion section 722 that are in spatial communication with each other, and a height 721H of the elastic arm section 721 is less than a height 722H of the engaging portion section 722. A width 81W in the engaging portions 814 of each of the sheet structures 81 is greater than the height 721H of the elastic arm section 721, and the width 81W may also be greater than the height 722H of the engaging portion section 722. Each of the sheet structures 81 can be engaged and fixed in the female-terminal slots 72 through the engaging portions 814.

When the two sheet structures 81 of the female terminals 8 are installed in the female-terminal slots 72, the elastic arms 813 are located in the elastic arm section 721, and the engaging portions 814 are located in the engaging portion 722.

Preferably, at least one of the engaging portions 814 is located in the elastic arm section 721, and remaining ones of the engaging portions 814 are located in the engaging portion section 722, so as to increase a connection strength between the sheet structures 81 and the female-terminal slots 72.

An outer edge distance H2 of the two elastic arms 813 included in each of the sheet structures 81 is less than the height 721H of the elastic arm section 721 of the female-terminal slot 72. An avoidance gap B is defined between an inner side of the female-terminal slot 72 and an outer side of the sheet structures 81 disposed in the female-terminal slot 72. A distance H3 between an outer side of each of the elastic arms 813 and the inner side of the female-terminal slot 72 gradually decreases from the free end of the elastic arm 813 to another end of the elastic arm 813. Through this configuration, when the male terminals 3 is inserted between the two elastic arms 813, the two elastic arms 813 are pushed by the male terminals 3, and elastically deformed toward corresponding avoidance gaps B.

When the female connector 200 and the male connector 100 are mated with each other, the elastic arms 813 of the sheet structures 81 of each of the female terminals 8 are in contact with the male terminals 3. Therefore, one single male terminal 3 is simultaneously held by the sheet structures 81 located in one of the female-terminal slots 72. Through this configuration, the contact area between the female terminals 8 and the male terminals 3 can be increased, so as to increase an amount of current transmitted by the female terminal 8.

In one embodiment, a thickness 81D of each of the sheet structures 81 (as shown in FIG. 10) is less than a width 3W of each of the male terminals 3 (as shown in FIG. 4). For example, the thickness 81D of each of the sheet structures 81 may be 0.5 times to 0.8 times the width 3W of each of the male terminals 3 and so the thickness 8D of each of the female terminals 8 is greater than or equal to the width 3W of each of the male terminals 3. Thereby, the problem of a reduced contact area due to a deviation between the female terminal 8 and the male terminal 3 can be avoided.

In another embodiment, the thickness 81D of each of the sheet structures 81 included in each of the female terminals 8 is at least 0.5 times the width 3W of each of the male terminals 3. In still another embodiment, the thickness 81D of each of the sheet structures 81 included in each of the female terminals 8 is at least 0.8 times the width 3W of each of the male terminals 3.

Through the design of any of the above-mentioned embodiments, the contact area between the female terminals 8 and the male terminals 3 can be effectively maintained or increased, thereby maintaining or even improving the current carrying capacity of the female terminals 8 and the male terminals 3. That is to say, the female terminals 8 and the male terminals 3 can carry larger currents.

Figure 14:
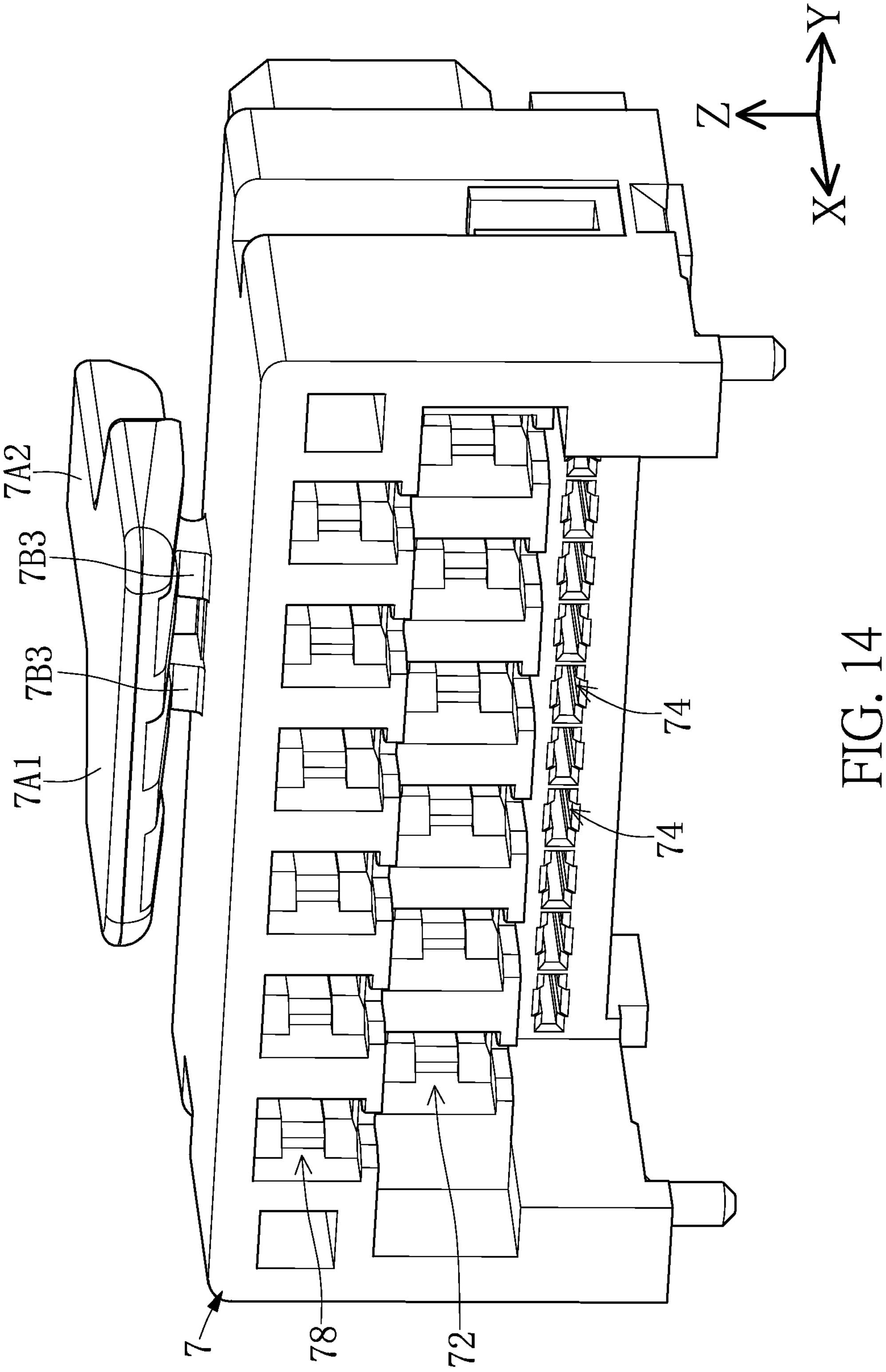
FIG. 14 is a schematic view showing another configuration of the insulating body of the female connector according to the present disclosure.

Referring to FIG. 3, FIG. 13, and FIG. 14, FIG. 14 is a schematic view of the insulating body of the female connector according to the present disclosure in another embodiment. As shown in FIG. 3, in one embodiment, the second insulating body 7 of the female connector 200 may also include a snap structure 7A. The snap structure 7A includes an operating portion 7A1, an engaging portion 7A2, and two elastic structures 7A3. The operating portion 7A1 and the engaging portion 7A2 are connected to each other. One side of the engaging portion 7A2 has an engaging groove 7A21 and a limiting structure 7A22. The operating portion 7A1 and the engaging portion 7A2 are connected to the second insulating body 7 through the two elastic structures 7A3. When the operating portion 7A1 is pressed, the engaging portion 7A2 is driven to rotate upward, and the two elastic structures 7A3 is elastically deformed. When the operating portion 7A1 is no longer pressed, the elastic restoring force generated by the two elastic structures 7A3 restores the engaging portion 7A2 to an unrotated position.

Referring to FIG. 13, when the female connector 200 and the male connector 100 are mated with each other, a snap structure 24 of the male connector 100 is correspondingly located in the engagement groove 7A21, and the snap structure 24 is restricted by the limiting structure 7A22 and cannot directly leave the engaging groove 7A21.

In a situation shown in FIG. 13, when the operating portion 7A1 is pressed, the engaging portion 7A2 is driven to rotate away from the snap structure 24. Accordingly, the limiting structure 7A22 will no longer restrict the snap structure 24, and the snap structure 24 can smoothly break away from the snap structure 7A.

It is worth mentioning that in the examples shown in FIG. 3, the two elastic structures 7A3 are arc-shaped structures. One of two ends of each of the two elastic structures 7A3 is connected to a side of the engaging portion 7A2 or the operating portion 7A1, and another one of the two ends is connected to a top surface of the second insulating body 7. Referring to FIG. 14, the two elastic structures 7B3 are located below the operating portion 7A1 and the engaging portion 7A2, one of two ends of each of the two elastic structures 7B3 is connected to a bottom of the operating portion 7A1 or the engaging portion 7A2, and another one of the two ends is connected to the top surface of the second insulating body 7. In different embodiments, the snap structure 24 can also be disposed on the second insulating body 7 of the female connector 200, and the snap structure 7A is disposed on the first insulating body 2 of the male connector 100.

Beneficial Effects of the Embodiments

In conclusion, in the board connector and the board-to-board connection assembly provided by the present disclosure, by configuring a single female terminal of the female connector to include more than one sheet structure, when the female terminal is used to transmit power, the current transmitted by the female terminal can be greatly increased. Accordingly, the problem that terminals of a small conventional female connector cannot carry a large amount of electricity can be effectively improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A board connector, comprising:

an insulating body including a plurality of female-terminal slots; and a plurality of female terminals, wherein at least one of the female terminals includes at least two sheet structures, the at least two sheet structures of the at least one of the female terminals are disposed in one of the female-terminal slots, and each of the at least two sheet structures has at least one elastic arm located in the female-terminal slot;

wherein wide sides of the at least two sheet structures of the at least one of the female terminals are in direct contact with each other.

2. The board connector according to claim 1, wherein a part of each of the at least two sheet structures is bent and defined as a transverse section and a longitudinal section, the transverse section is fixedly disposed in the female-terminal slot, one end of the transverse section has the least one elastic arm, and one end of the longitudinal section is electrically coupled to a circuit board.

3. The board connector according to claim 1, wherein the insulating body further includes at least two auxiliary fixing structures, the board connector further includes two auxiliary fixing components, a part of each of the two auxiliary fixing components is configured to be fixed to one of the at least two auxiliary fixing structures, and another part of each of the two auxiliary fixing components is configured to be fixed on a circuit board.

4. The board connector according to claim 1, wherein a quantity of the at least one elastic arm in each of the at least two sheet structures is two, and an insertion gap is defined between inner surfaces of the two elastic arms that are configured to face each other and be spaced apart from each other.

5. The board connector according to claim 4, wherein an outer edge distance between the two elastic arms of each of the at least two sheet structures is less than a height of the female-terminal slot, and an avoidance gap is defined between an inner side of the female-terminal slot and an outer side of each of the at least two sheet structures disposed in the female-terminal slot.

6. The board connector according to claim 1, wherein each of the at least two sheet structures further has a plurality of engaging portions, a width of a portion of each of the at least two sheet structures having the engaging portion is greater than a height of the female-terminal slot, and each of the at least two sheet structures is fixed in the female-terminal slot through the engaging portions.

7. The board connector according to claim 1, further comprising:

a plate structure extending from one side of an end surface of the insulating body, wherein the plate structure has a plurality of signal slots; and at least one signal terminal, wherein a part of the at least one signal terminal is located in one of the signal slots.

8. A board connector, comprising:

an insulating body;

a plurality of tubular structures extending from an end surface of the insulating body, wherein each of the tubular structures has one or more female-terminal slots; and a plurality of female terminals, wherein at least one of the female terminals includes at least two terminal components, and wherein each of the female terminals is disposed in one of the female-terminal slots;

wherein each of the at least two terminal components is a sheet structure, wherein wide sides of the at least two terminal components of the at least one of the female terminals are in direct contact with each other.

9. The board connector according to claim 8, wherein each of the at least two terminal components has a transverse section, a longitudinal section, and at least one elastic arm, the transverse section is connected between the longitudinal section and the at least one elastic arm, and wherein multiple ones of the longitudinal section of the at least two terminal components disposed in one of the female-terminal slots are attached to each other.

10. The board connector according to claim 8, wherein the tubular structures are arranged side by side to form a rectangular array that is divided into a plurality of rows in a perpendicular direction, and a length of the female-terminal slot located above is greater than a length of the female-terminal slot located below.

11. The board connector according to claim 8, further comprising:

a plate structure extending from one side of the end surface of the insulating body, wherein the plate structure has a plurality of signal slots; and at least one signal terminal located in one of the signal slots.

12. The board connector according to claim 11, wherein the tubular structures are arranged side by side to form a rectangular array, and the plate structure is located on one side of the rectangular array.

13. The board connector according to claim 11, wherein the at least one signal terminal has a transverse section, a longitudinal section, and at least one elastic arm, each of the at least two terminal components has a transverse section, a longitudinal section, and at least one elastic arm, the transverse section, the transverse section of the at least one signal terminal fixed in the signal slot is perpendicular to the transverse section of the terminal component fixed in the female-terminal slot.

14. A board-to-board connection assembly, comprising:

a male connector fixed on a first circuit board, wherein the male connector includes:

a first insulating body including a plurality of first terminal-male slots; and a plurality of male terminals, wherein one of two ends of each of the male terminals is located in one of the first terminal-male slots, and another one of the two ends of each of the male terminals is electrically coupled to the first circuit board; and a female connector fixed on a second circuit board, wherein the female connector includes:

a second insulating body including a plurality of tubular structures, wherein, when the male connector is docked with the female connector, the tubular structures are inserted into the first terminal-male slots; and a plurality of female terminals, wherein one of two ends of each of the female terminals is located in one of the tubular structures, and another one of the two ends of each of the female terminals is electrically coupled to the second circuit board;

wherein at least one of the female terminals includes at least two sheet structures, wherein wide sides of the at least two sheet structures of the at least one of the female terminals are in direct contact with each other.

15. The board-to-board connection assembly according to claim 14, further comprising a snap structure located on the first insulating body or the second insulating body, wherein the snap structure includes an operating portion, an engaging portion, and two elastic structures, and wherein the operating portion and the engaging portion are connected to each other, and the operating portion and the engaging portion are connected to the first insulating body or the second insulating body through the two elastic structures.

16. The board-to-board connection assembly according to claim 14, wherein at least one of the female terminals includes a plurality of terminal components, and each of the terminal components has a contact segment, a fixing segment, and a pin segment, and wherein multiple ones of the contact segment of the terminal components of one of the female terminals are located in one of the tubular structures, multiple ones of the pin segment are electrically coupled to the second circuit board, and the fixing segment is connected between the contact segment and the pin segment and fixed in the second insulating body.

17. The board-to-board connection assembly according to claim 14, wherein each of the sheet structures has a transverse section, a longitudinal section, and two elastic arms, wherein the transverse section is connected between the two elastic arms and the longitudinal section, and wherein multiple ones of the longitudinal section of the sheet structures of one of the female terminals are attached to each other.

18. The board-to-board connection assembly according to claim 17, wherein a thickness of each of the sheet structures is less than a width of each of the male terminals.

19. The board-to-board connection assembly according to claim 14, wherein the male connector further includes a first signal slot and at least one first signal terminal, and one end of the at least one first signal terminal is located in the first signal slot, wherein the female connector further includes a plate structure and at least one second signal terminal, and one end of the at least one second signal terminal is located in the plate structure, and wherein, when the male connector is docked with the female connector, the plate structure is inserted into the first signal slot, so that the at least one first signal terminal is electrically coupled to the at least one second signal terminal.

* * * * *